United States Patent [19]

Cho et al.

[11] Patent Number: 5,206,098
[45] Date of Patent: Apr. 27, 1993

[54] BATTERY COVER LOCKING DEVICE

[75] Inventors: Young-In Cho; Young-Mok Jeon, both of Seoul, Rep. of Korea

[73] Assignee: SamSung Electronics Co., Ltd., Suwon, Rep. of Korea

[21] Appl. No.: 815,758

[22] Filed: Jan. 2, 1992

[30] Foreign Application Priority Data

Dec. 28, 1991 [KR] Rep. of Korea ............... 1991-24804

[51] Int. Cl.$^5$ ............................................. H01M 2/10
[52] U.S. Cl. ....................................... 429/96; 429/100
[58] Field of Search ................. 429/96, 97, 98, 100

[56] References Cited

U.S. PATENT DOCUMENTS

| | | | |
|---|---|---|---|
| 3,897,268 | 7/1975 | Haraguchi | 429/97 |
| 3,999,110 | 12/1976 | Ramstrom et al. | 429/98 X |
| 4,072,800 | 2/1978 | Gammer | 429/98 X |
| 4,146,682 | 3/1979 | Nakao | 429/97 |
| 4,752,539 | 6/1988 | Vatter | 429/97 X |
| 4,784,926 | 11/1988 | Sato | 429/96 |

Primary Examiner—Stephen Kalafut
Attorney, Agent, or Firm—Robert E. Bushnell

[57] ABSTRACT

Disclosed is a battery cover locking device of a small electronic apparatus using a battery such as a radio paging receiver and a remote control box, wherein a battery cover comprises a locker having a hinge engaged with a guide box groove of a main housing, and said battery cover is slid and rotated in said main housing by operating said locker so as to be opened and closed for opening and closing a battery inserting hole formed on a side of said main housing.

17 Claims, 3 Drawing Sheets

BATTERY COVER LOCKING DEVICE

BACKGROUND OF THE INVENTION

The present invention relates to a locking device for preventing an unintentional opening of a cover of a battery inserting hole in a small electronic apparatus using a battery, such as a radio paging receiver and a remote control box.

Since a battery cover of a small electronic apparatus such as a radio paging receiver may be opened unintentionally by a hand touching, such a small electronic apparatus is usually provided with a locking device that makes it possible to open the battery cover only by applying an intentional force.

Referring to FIGS. 1A and 1B, a conventional locking device is described in detail as follows.

A cover groove 41 is formed on a bottom side of a main case 40, and one side of the cover groove comprises a battery inserting hole 42. A support plate 44 is formed on a side of the battery inserting hole 42 and has a guide groove 45 in its center portion. A guide rib 46 is formed on a side wall of the battery inserting hole 42. A cover 50 is shorter than the cover groove 41 by a given length and has a groove 51 extended to a horizontal direction on both sides. An opening is formed on a side of the cover 50 receiving a locker 60 having a hinge 61 on its side, of which hinge 61 is assembled with the cover 50. The locker 60 has a projection on both sides of its bottom side and a projection to be engaged with a fore end 45A of the guide groove 45.

At the time of closing the cover 50, a fore end 60B of the locker 60 is laid on a projection 53 of the cover wall because a rear end 60A of the locker 60 is contacted with the support plate 44. By pushing the cover 50 to the battery inserting hole 42, the cover 50 covers the inserting hole 42. Because the guide rib 46 is engaged with the groove 51 of the cover 50 and a projection 55 of fore end of the cover is engaged with a groove 48 of the main housing 40, the cover is not derailed. By pressing the fore end 60B of the locker 60 to a direction of the arrow in FIG. 1B, the locker 60 is rotated so as to contact its projection rib 65 with a wall 45A of the support plate 44 and prevent the cover 50 from being pushed backward. And the fore end of the locker 60 is not moved over a projection 53 without applying an external force. Finally the cover is locked completely.

When the cover 50 is opened for replacing a battery, the locker 60 is rotated counterclockwise, about the hinge 61, and the projection ridge 65 is slid over the support plate 44 by pressing the rear end 60A of the locker 60 downward. By sliding the cover 50 backward, the guide rib 46 of the side wall is disengaged with the groove 51 and the projection 55 is disengaged with the groove 48 of the main housing 40. Thereafter, the cover 50 is removed freely.

In such a conventional device, there occurs a case that the cover is apt to be lost frequently because the cover is removed completely for replacing a battery. Also, because it is very difficult to assemble the locker 60 with the cover 50, it results in an inefficiency of assembling. In addition, a seesaw motion of the locker 60 at the hinge 61 results in damaging the projection 53 for stopping the locker.

SUMMARY OF THE INVENTION

It is an object of the present invention to provide a battery cover locking device for preventing a loss of the battery cover during the opening of the cover by making the cover remain connected to the main housing.

It is another object of the present invention to install and remove the cover from the main housing easily during replacing a battery.

According to the present invention, in FIG. 2, a battery cover locking device of a small electronic apparatus using a battery such as a radio paging receiver and a remote control box comprises a locker (30) provided in the rear side of a battery cover (20), and a hinge (31) attached to the locker for cooperating with a guide box groove (15) formed in a main housing (10), whereby the battery cover (20) is slid and rotated in the main housing (10) by operating the locker (30) so as to open and close a battery inserting hole (12) formed in a bottom of said main housing (10).

The present invention will now be described more specifically with reference to the drawings attached only by way of example.

DETAILED DESCRIPTION OF THE PREFERRED EMBODIMENTS

Figure 1A:
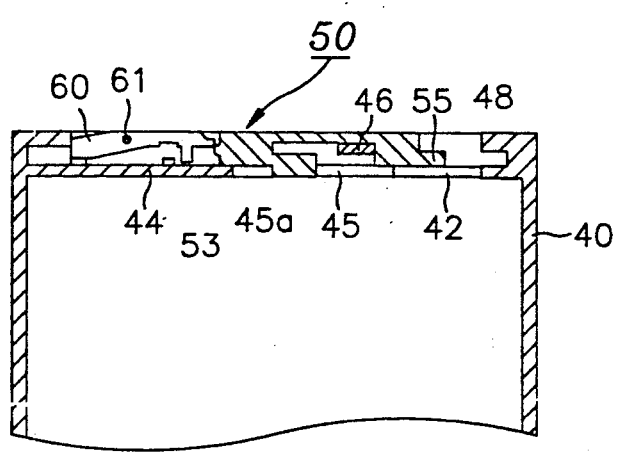
FIGS. 1A and 1B are partial cross-sectional views of a conventional battery cover locking device.
Figure 1B:
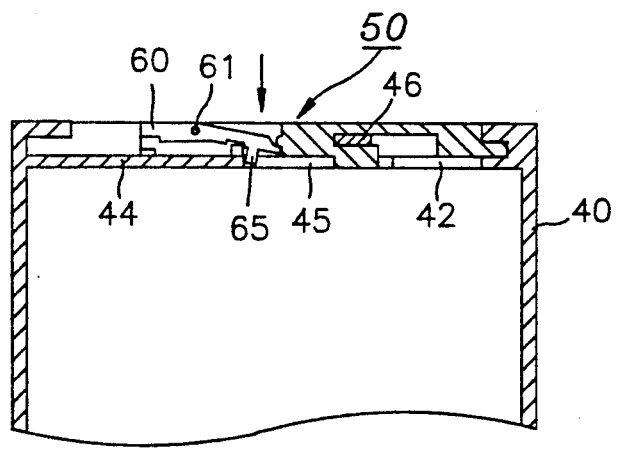
Figure 2:
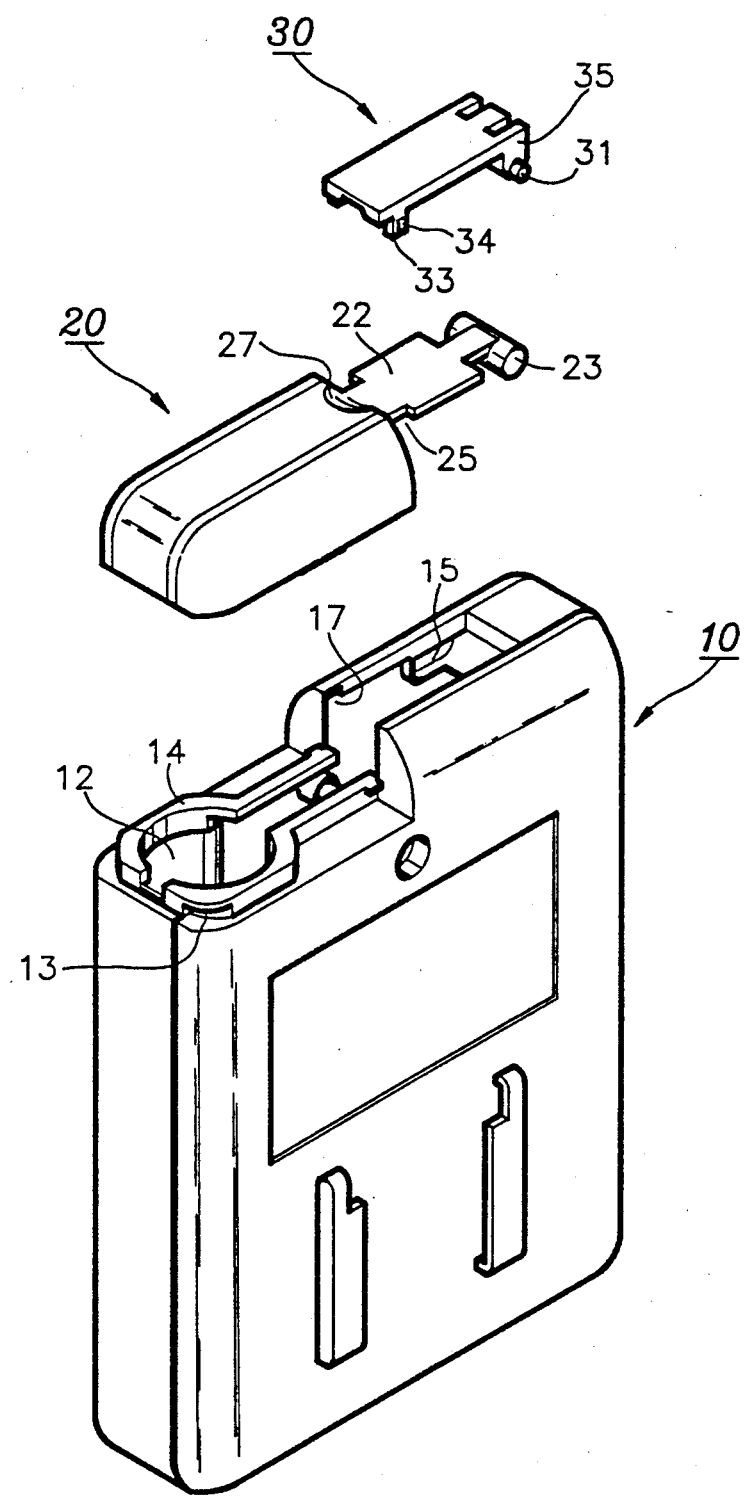
FIG. 2 is an exploded view of a battery cover locking device according to the present invention.

Referring to FIG. 2, a main housing 10 has a battery chamber 11 in its bottom side, and an engagement groove 13 for locking a battery cover 20 is formed on a circumference surface of a battery inserting hole 12. A projection portion 14 is formed on an inner opposite side of the engagement groove 13, and a guide box groove 15 is formed on a front side of the projection portion 14 so as to engage with a hinge 31 of a locker 30 interlocked with the battery cover 20 for the locker to be rotated and slid. The battery cover 20 has a rear stepped extension 22 comprising a hinge 23 on its rear end and a groove 25 on its fore end for receiving a front rib 33 of the locker 30.

The locker 30 comprises a hinge 31 projected outward from a rear rib 35 on its rear bottom side and a hinge groove formed on its inner side of the rear rib 35 for receiving the hinge 23 of the cover 20. A front side of the locker 30 has a front rib 33 forming outwardly a projection 34 so as to engage with an inner groove 17 of the main housing 10. The rear rib 35 is longer in its height than in its width. The reference number of 27 is a finger tip groove for pulling the locker 30.

Figure 3A:
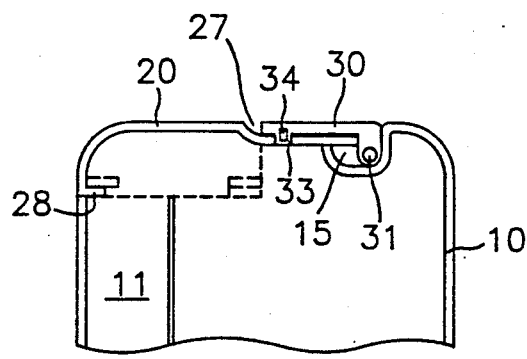
FIGS. 3A, 3B and 3C are views of operation of the essential parts of a battery cover locking device according to the present invention.

In a state of locking the main housing 10 with the battery cover 20, the hinge 31 of the locker 30 is engaged with a rear end of the guide box groove 15 of the main housing 10, a fore projection 28 of the cover 20 is engaged with the engagement groove 13 of the main housing 10, and the projection 34 of the locker 30 is engaged with the inner groove (not shown) of the main housing, as shown in FIG. 3A. Accordingly the battery cover 20 is locked with the main housing tightly.

Figure 3B:
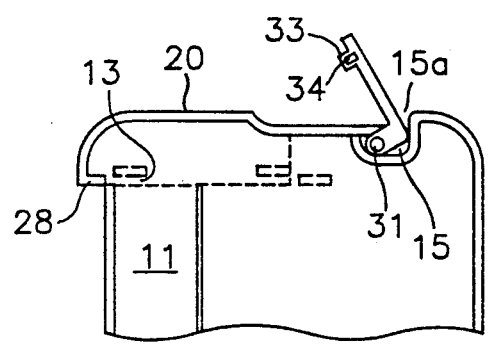
Figure 3C:
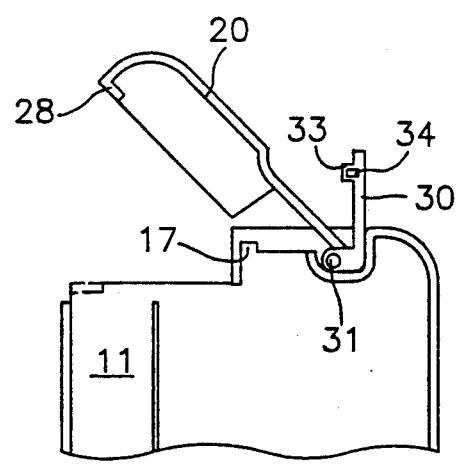

When the cover 20 is opened for replacing a battery, as in FIG. 3B, the locker 30 is rotated at the hinge 31 so as to make the projection 34 slip off the groove (not shown) and opened by pulling the locker 30 upward. The rear edge of the locker 30 is contacted with a inner wall 15A of the main housing and the hinge 31 is pushed forward because the height of the rear rib 35 is longer than its width. Because the hinge 31 is pushed forward in the guide box groove 15, the battery cover 20 is also pushed forward. Accordingly the projection 28 of the cover 20 is slipped off the locking groove 13 and the front face of the cover 20 is projected from the main housing 10. Thereafter the cover 20 is opened as shown in FIG. 3B. By pulling the front end of the cover 20 upward, the cover 20 is rotated at the hinge 23 so as to open the battery inserting hole 12 of the main housing 10 as shown in FIG. 3C.

When the cover 20 is closed after replacing a battery, the hinge 31 of the locker 30 is pushed backward in the guide box groove 15 and the projection 28 of the cover 20 is engaged with the locking groove 13 by pulling the cover backward after closing. Afterward the projection 34 of the front rib 33 of the locker 30 is engaged with the inner groove 17 of the main housing by pressing down the locker 30 by rotating. Accordingly the battery cover 20 is locked so as not to slide forward.

As described, the locking device prevents a loss of the cover in any case because the cover is not separated from the main housing when the cover is opened. And it is easy to open and close the battery cover in the locking device.

What is claimed is:

1. A battery cover locking device of a small electronic apparatus using a battery, comprising:
   a locker provided in the rear side of a battery cover; and
   a hinge attached to said locker for cooperating with a guide box groove formed in a main housing, whereby said battery cover is slid and rotated in said main housing by operating said locker so as to open and close a battery inserting hole formed in a side of said main housing.

2. The battery cover locking device as claimed in claim 1,
   wherein said battery cover is interlocked with said locker by engaging a hinge of said battery cover with an inner groove of a rear rib of said locker.

3. The battery cover locking device as claimed in claim 2,
   wherein said rear rib is formed downward from a rear bottom side of said locker and a height of said rear rib is longer than a width.

4. The battery cover locking device as claimed in claim 2,
   wherein a projection is formed on an outside of a front rib of a front bottom side of said locker and engaged with an inner groove of said main housing so as to prevent said battery cover from sliding forward and backward.

5. The battery cover locking device as claimed in claim 1, wherein said small electronic apparatus is one of a radio page receiver and a remote control box.

6. A battery cover locking device of a battery-powered small electronic apparatus having a main body with a compartment for a battery, comprising:
   a guide box groove formed in said main body;
   a battery cover for sliding and rotating along said main body to open and close said compartment;
   locker means connected to said battery cover, for sliding said battery cover along said main body;
   a hinge attached to said locker means for cooperating with said guide box groove and allowing rotation of said locker means about said hinge.

7. The battery cover locking device as claimed in claim 6, wherein said battery cover comprises:
   a battery cover hinge interlocked with an inner groove of said locking means for allowing rotation of said battery cover about said battery cover hinge;
   cover means for covering said compartment; and
   a rear stepped extension for connecting said battery cover hinge to said cover means.

8. The battery cover locking device as claimed in claim 7, wherein said battery cover further comprises a finger tip groove to allow a finger to push on a bottom side of said locker means.

9. The battery cover locking device as claimed in claim 7, wherein said locker means comprises a rear rib connecting said locker means to said hinge and containing said inner groove for interlocking said locker means to said battery cover.

10. The battery cover locking device as claimed in claim 9, wherein said rear rib is formed downward from said bottom side of said locker means, having a height longer than a width.

11. The battery cover locking device as claimed in claim 9, wherein a protrusion is formed on said bottom side of said locker means for engaging a first engagement groove of said main body to prevent said battery cover from sliding along said main body.

12. The battery cover locking device as claimed in claim 7, wherein said battery cover further comprises a fore projection attached to said cover means for engaging an engagement groove formed on said main body to prevent rotation of said battery cover about said battery cover hinge.

13. The battery cover locking device as claimed in claim 11, wherein said battery cover further comprises a fore projection attached to said cover means for engaging a second engagement groove formed on said main body to prevent rotation of said battery cover about said battery cover hinge.

14. The battery cover locking device as claimed in claim 6, wherein said battery cover comprises:
   cover means for covering said compartment; and
   a rear stepped extension, comprising:
      a battery cover hinge cooperating with an inner groove of said locking means for allowing rotation of said battery cover about said battery cover hinge; and
      an extension groove.

15. The battery cover locking device as claimed in claim 14, wherein said locker means comprises:
   a first rib connecting said locker means to said hinge and containing said inner groove for interlocking said locker means to said battery cover; and
   a second rib attached to a bottom side of said locking means;
   a protrusion connected to said second rib, for fitting within said extension groove and for engaging a first engagement groove of said main body to prevent said battery cover from sliding along said main body.

16. A battery cover locking device of a small electronic apparatus having a main housing with a battery compartment, said battery cover locking device comprising:
   a locker comprising:
      a first rib formed on a bottom of said locker;

a hinge attached to said first rib for engaging with a guide box groove of said main housing and for allowing rotation of said locker;

a second rib formed on said bottom of said locker; and a protrusion attached to said second rib for engaging with an inner groove formed in said main housing to hold said locker in place; and a battery cover slid along said main housing by rotation of said locker means, said battery cover comprising:

cover section to cover said battery compartment an extension, a first side of said extension attached to said cover section;

a cover hinge attached to a second side of said extension and connected to said first rib for allowing rotation of said battery cover about said cover hinge.

17. The battery cover locking device as claimed in claim 16, wherein said battery cover further comprises a fore protrusion to engage an engagement groove located around a circumference of said battery compartment, to prevent rotation of said battery cover about said cover hinge.

* * * * *